(12) United States Patent
Bhogal et al.

(10) Patent No.: US 9,094,702 B2
(45) Date of Patent: Jul. 28, 2015

(54) CUSTOMIZING LANGUAGE AND CONTENT OF MEDIA FOR AN ANNOUNCEMENT

(71) Applicant: International Business Machines Corporation, Armonk, NY (US)

(72) Inventors: Kulvir S. Bhogal, Fort Worth, TX (US); Gregory J. Boss, Saginaw, MI (US); Sheryl L. Comes, Castle Pines, CO (US); Rick A. Hamilton, II, Charlottesville, VA (US); Anne R. Sand, Canon City, CO (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 13/927,153

(22) Filed: Jun. 26, 2013

(65) Prior Publication Data

US 2015/0007221 A1 Jan. 1, 2015

(51) Int. Cl.
*H04N 7/025* (2006.01)
*H04N 21/258* (2011.01)
*G06F 17/30* (2006.01)
*H04N 21/45* (2011.01)
*H04N 21/233* (2011.01)

(52) U.S. Cl.
CPC .... *H04N 21/25883* (2013.01); *G06F 17/30746* (2013.01); *H04N 21/2335* (2013.01); *H04N 21/25841* (2013.01); *H04N 21/4532* (2013.01)

(58) Field of Classification Search
CPC .............................. H04W 4/02; H04N 21/258
See application file for complete search history.

(56) References Cited

U.S. PATENT DOCUMENTS

| | | | |
|---|---|---|---|
| 6,754,504 B1* | 6/2004 | Reed | 455/517 |
| 7,606,215 B2 | 10/2009 | Poniatowski | |
| 8,330,864 B2* | 12/2012 | Blumenschein et al. | 348/564 |
| 2006/0075439 A1 | 4/2006 | Vance | |
| 2013/0138422 A1 | 5/2013 | Daye et al. | |
| 2013/0165151 A1* | 6/2013 | Gits et al. | 455/456.3 |

FOREIGN PATENT DOCUMENTS

WO 2012173664 A1 12/2012

\* cited by examiner

*Primary Examiner* — Jefferey Harold
*Assistant Examiner* — Samira Monshi
(74) *Attorney, Agent, or Firm* — Abdul-Samad A. Adediran; John Pivnichny

(57) ABSTRACT

Program code on mobile computing devices and a server computer receive information about mobile computing devices within a defined area. The program code selects an announcement, from a database based on the information received, having audio that is in a language determined as being utilized within the defined area, wherein the language is assigned a first highest ranking, and wherein the first highest ranking indicates that the language is spoken by a majority of persons within the defined area. The program code selects a transcription of the audio from the database, wherein the transcription is in a language determined as being utilized within the defined area, and wherein the language is assigned a second highest ranking. The program code instructs a television within the defined area to output the audio, and to output the transcription of the audio on a display screen of the television.

12 Claims, 4 Drawing Sheets ized language and content of media for an announcement in accordance with an embodiment of the present invention.

CUSTOMIZING LANGUAGE AND CONTENT OF MEDIA FOR AN ANNOUNCEMENT

BACKGROUND

1. Field of the Invention

The present invention relates generally to content filtering of media, and more particularly to a media content filtering program for customizing language and content of media for an announcement.

2. Description of the Related Art

Mobile computing technology has dramatically increased the frequency and the amount of media being delivered to the public at any given point in time. Thus, even in public venues people with mobile computing devices are continuously bombarded with media throughout their daily life. Various computer software systems exist for delivering media for an announcement in a public venue. However, the computer software systems that exist for automated delivery of media for an announcement in a public venue are insufficient. In particular, existing computer software systems are insufficient, because the computer software systems may not adequately customize the language and content for members of the public to view.

SUMMARY

Aspects of an embodiment of the present invention disclose a method, computer system, and program product for customizing language and content of media for an announcement. A computer receives information about mobile computing devices within a defined area. The computer selects an announcement, from a database based on the information that is received, having audio that is in a language determined as being utilized within the defined area, wherein the language is assigned a first highest ranking, and wherein the first highest ranking indicates that the language is spoken by a majority of persons within the defined area. The computer selects a transcription of the audio from the database, wherein the transcription is in a language determined as being utilized within the defined area, and wherein the language is assigned a second highest ranking. The computer instructs a television, of an announcement system, within the defined area to output the audio, and to output the transcription of the audio on a display screen of the television.

DETAILED DESCRIPTION

Figure 1:
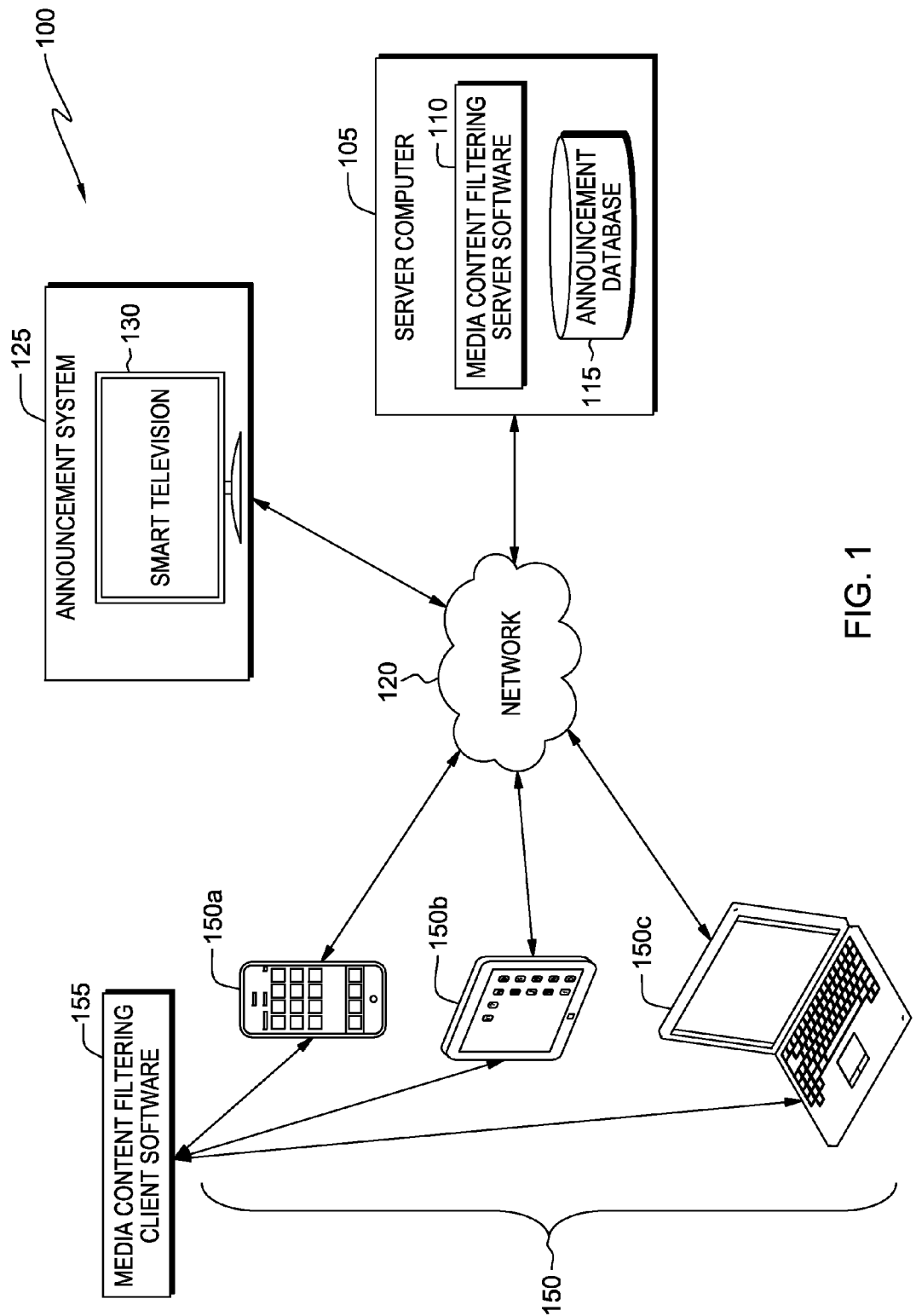
FIG. 1 is a block diagram of distributed computer system that includes an announcement system that interacts with a mobile computing device and a server computer that is installed with media content filtering software, wherein the media content filtering software is program code for customizing language and content of media for an announcement in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a media content filtering software for customizing language and content of media for an announcement. The announcement can be in a public setting such as at a mass-transit passenger terminal or in a private setting such as at a family gathering. A preferred embodiment of the present invention is practiced in the context of an announcement system at a mass-transit passenger terminal, such as an airport, bus, or train passenger terminal. The media content filtering software can interact (i.e., communicate via a network) with the terminal's existing announcement system that includes a smart television. In addition, the media content filtering software can interact with a mobile computing device to collect information that can be utilized to personalize the language and content of media for announcement via the announcement system. The term "language," as used in this specification, refers to natural languages used for human communication such as, for example, English, Arabic, Cantonese, French, German, Hindi, Spanish, and Yoruba.

Specifically, the media content filtering software collects information about mobile computing devices within a defined area in order to identify a language being utilized (e.g., spoken) within the defined area, and to estimate the proportion of persons within the defined area who are using the language identified. More than one language being utilized may be identified within the defined area. Media content filtering software assigns a ranking to each of the identified languages according to their usage in order to determine how to deliver announcements to the viewers of a smart television that is within the defined area. For example, it may be estimated that 50 percent of the passengers are speaking English, 45 percent are speaking Cantonese, and 5 percent are speaking French. Accordingly, since English is estimated as the first most spoken language within the defined area, and Cantonese is estimated as the second most spoken language within the defined area then the media content filtering software instructs the announcement system to output an English version of audio, that can be associated to a video file, from the smart television that is within the defined area, and to output a Cantonese transcription of the audio on a display screen of the smart television.

FIG. 1 illustrates computer system 100 that includes server computer 105 having media content filtering server software 110 and announcement database 115, network 120, announcement system 125 having smart television 130, and mobile computing devices 150 each having media content filtering client software 155 (e.g., a downloadable mobile software application). Media content filtering server software 110 can interact and exchange data (i.e., communicate), via network 102, with announcement system 125 and media content filtering client software 155. Specifically, media content filtering client software 155 can send information about mobile computing devices 150 to media content filtering server software 110 and announcement system 125. Mobile computing devices 150 include cellular phone 150a (e.g., smartphone), tablet 150b, laptop 150c, and any other portable electronic computing device that is capable of electronic communication, via network 120, with smart television 130.

Media content filtering server software 110 receives information about mobile computing devices 150 within a defined area, and based on the information received media content filtering server software 110 can perform the following: determines one or more languages being utilized (e.g., spoken) within the defined area, assign a ranking to each of the languages identified; select an announcement, from announcement database 115, having audio that is in one of the languages determined; select an transcription of the audio, from the announcement database 115, that is in one of the languages determined; instruct smart television 130 to output the audio; and instruct smart television 130 to output the transcription of the audio on a display screen of smart television 130.

Network 120 can be, for example, a local area network (LAN), a wide area network (WAN), or a combination of the two, and include wired, wireless, or fiber optic connections. In general, network 120 can be any combination of connections and protocols that will support communications between mobile computing devices 150, announcement system 125, and server computer 105.

Figure 2A:
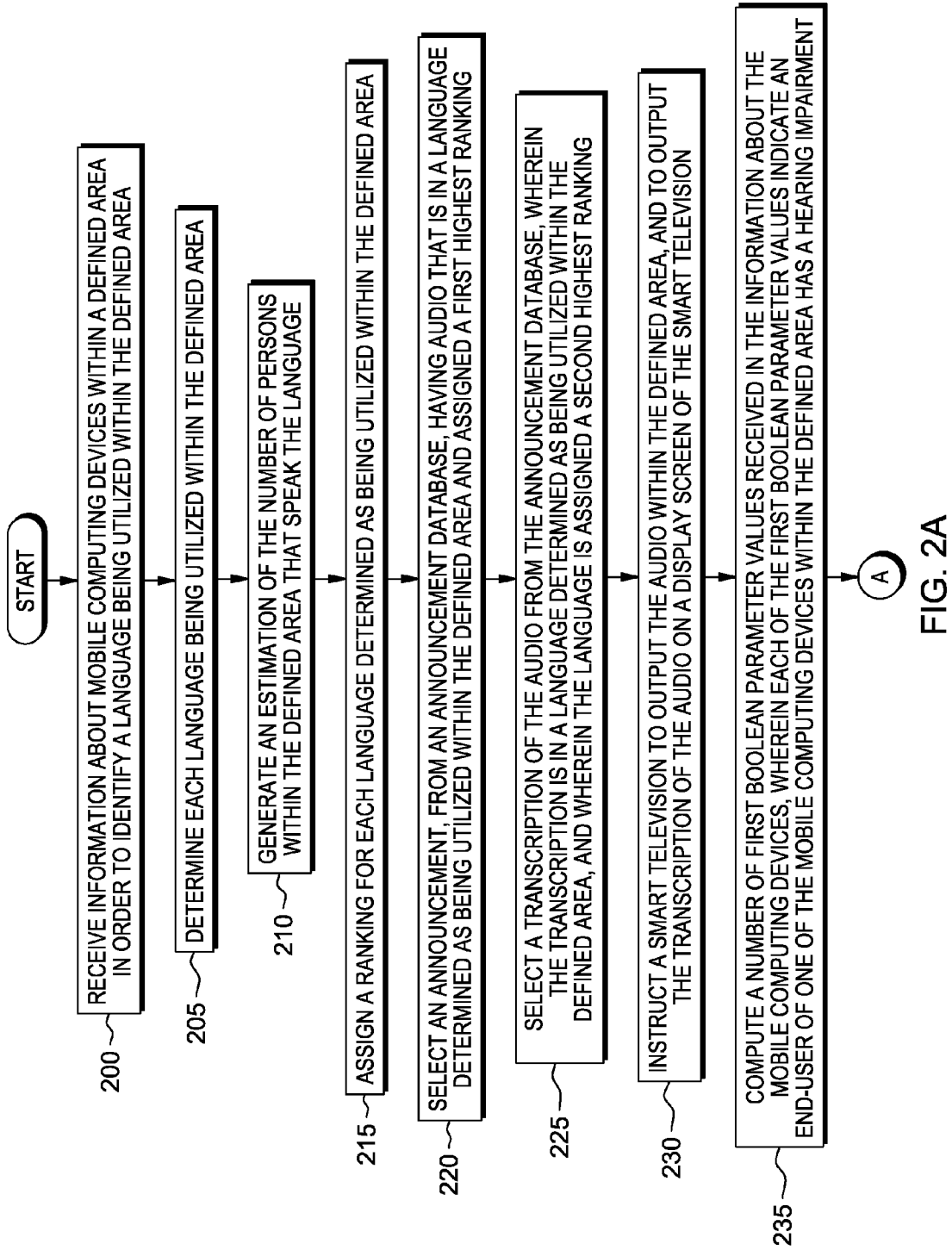
FIG. 2A is the first part of a flowchart illustrating operations of the program code according to an embodiment of the present invention.
Figure 2B:
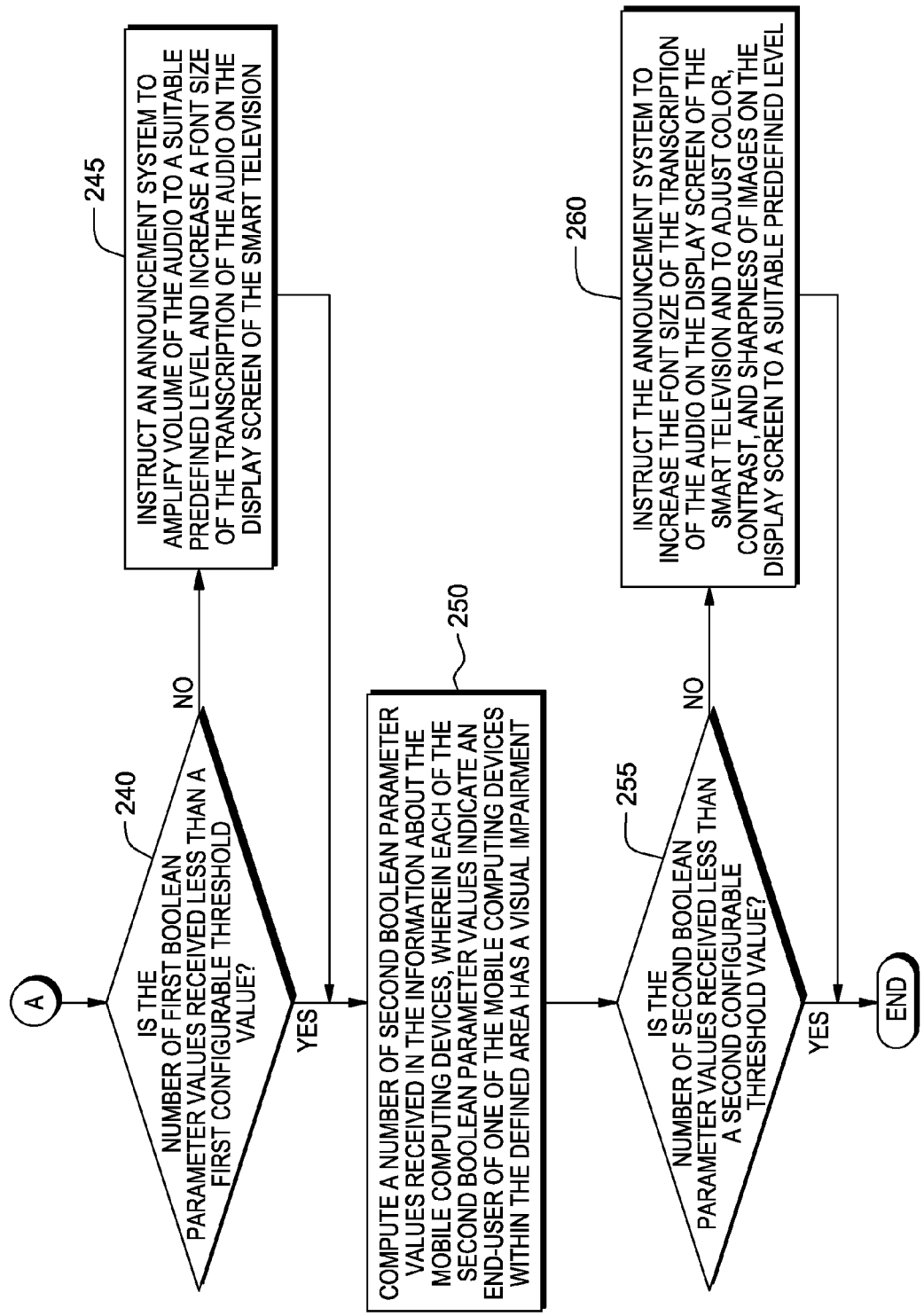
FIG. 2B is the second part of a flowchart illustrating operations of the program code according to an embodiment of the present invention.

FIGS. 2A and 2B are flowcharts illustrating the steps of program code, media content filtering client software 155 and media content filtering server software 110, for customizing language and content of media for an announcement. In the disclosed embodiment, the program code on server computer 105 receives information about mobile computing devices 150 within a defined area in order to identify a language being utilized (e.g., spoken) within the defined area (block 200). The information received about mobile computing devices 150 includes the following: a number of mobile computing devices 150 within the defined area, a default language parameter of each of mobile computing devices 150 within the defined area, one or more first boolean parameter values that indicates if an end-user of one of mobile computing devices 150 that are within the defined area has a hearing impairment, and one or more second boolean parameter values that indicates if an end-user of one of mobile computing devices 150 that are within the defined area has a visual impairment. Moreover, the information received can be in response to on an end-user logging into announcement system 125 via one of the mobile computing devices 150 having a radio-frequency identification (RFID) tag containing the information.

Next, based on a default language parameter of each of mobile computing devices 150 within the defined area, the program code determines each language being utilized (e.g., spoken) within the defined area (block 205). For example, if the default language parameter of one of mobile devices 150 is English, then the program code determines that at least English is being spoken within the defined area. Subsequently, for each language determined as being utilized within the defined area the program code generates an estimation of the number of persons within the defined area that speak the language (block 210). For example, to generate the estimation of the number of persons within the defined area that speak a language the program code computes the number of mobile computing devices 150 having the default language parameter set to the language.

Next, the program code assigns a ranking for each language determined as being utilized within the defined area (block 215). In particular, the ranking for each language determined as being utilized within the defined area is based on the estimation of the number of persons within the defined area that speak the language. For example, the program code may generate an estimation that 50 percent of the persons within the defined area are speaking English, 45 percent are speaking Yoruba, and 5 percent are speaking Hindi. Accordingly, since English is estimated as the first most spoken language within the defined area and Yoruba is estimated as the second most spoken language within the defined area then the program code assigns a first highest ranking to English, and a second highest ranking to Yoruba.

The rankings assigned are utilized by the program code to determine how to deliver announcements to the viewers of smart television 130 that is within the defined area. Thus, subsequent to assigned a ranking for each language determined as being utilized within the defined area, the program code selects an announcement, from announcement database 115, having audio that is in a language determined as being utilized within the defined area and assigned a first highest ranking (block 220). Next, the program code selects a transcription of the audio from the announcement database 115, wherein the transcription is in a language determined as being utilized within the defined area, and wherein the language is assigned a second highest ranking (block 225). Thus, announcements database 115 stores each announcement as a record that can include a video file, audio associated to the video file in various languages (e.g., Cantonese, English, French, and Yoruba), and transcriptions of the audio in various languages. Subsequently, the program code instructs smart television 130 to output the audio within the defined area, and to output the transcription of the audio on a display screen of smart television 130 (block 230). Moreover, in other embodiments the program code can instruct smart television 130 to output one or more additional transcriptions of the audio on the display screen of smart television 130, wherein the additional transcriptions are each in a language determined as being utilized within the defined area, and wherein the language is assigned a ranking that is lower than the second highest ranking.

Furthermore, the program code computes the number of first boolean parameter values received in the information about mobile computing devices 150, wherein each of the first boolean parameter values indicate an end-user of one of mobile computing devices 150 within the defined area has a hearing impairment (block 235). If the number of first boolean parameter values received is less than a first configurable threshold value (the "YES" branch of decision block 240), then the program code computes the number of second boolean parameter values received in the information about mobile computing devices 150, wherein each of the second boolean parameter values indicate an end-user of one of mobile computing devices 150 within the defined area has a visual impairment (block 250). Otherwise, if the number of first boolean parameter values received is greater than or equal to the first configurable threshold value (the "NO" branch of decision block 240), then the program code instructs announcement system 125 to amplify the volume of the audio to a suitable predefined level and increase the font size of the transcription of the audio on the display screen of smart television 130 (block 245). Accordingly, if the first configurable threshold value is exceeding, then this indicates that a majority of the persons within the defined area have a hearing impairment.

Next, the program code computes the number of second boolean parameter values received in the information about mobile computing devices 150, wherein each of the second boolean parameter values indicate an end-user of one of mobile computing devices 150 within the defined area has a visual impairment (block 250). If the number of second boolean parameter values received is less than a second configurable threshold value (the "YES" branch of decision block 255), then the program code ends. However, if the number of second boolean parameter values received is greater or equal to the second configurable threshold value (the "NO" branch of decision block 255), then the program code instructs announcement system 125 to increase the font size of the transcription of the audio on the display screen of smart television 130 and to adjust the color, contrast, and sharpness of images on the display screen to a suitable predefined level (block 260). Subsequently, the program code ends.

Figure 3:
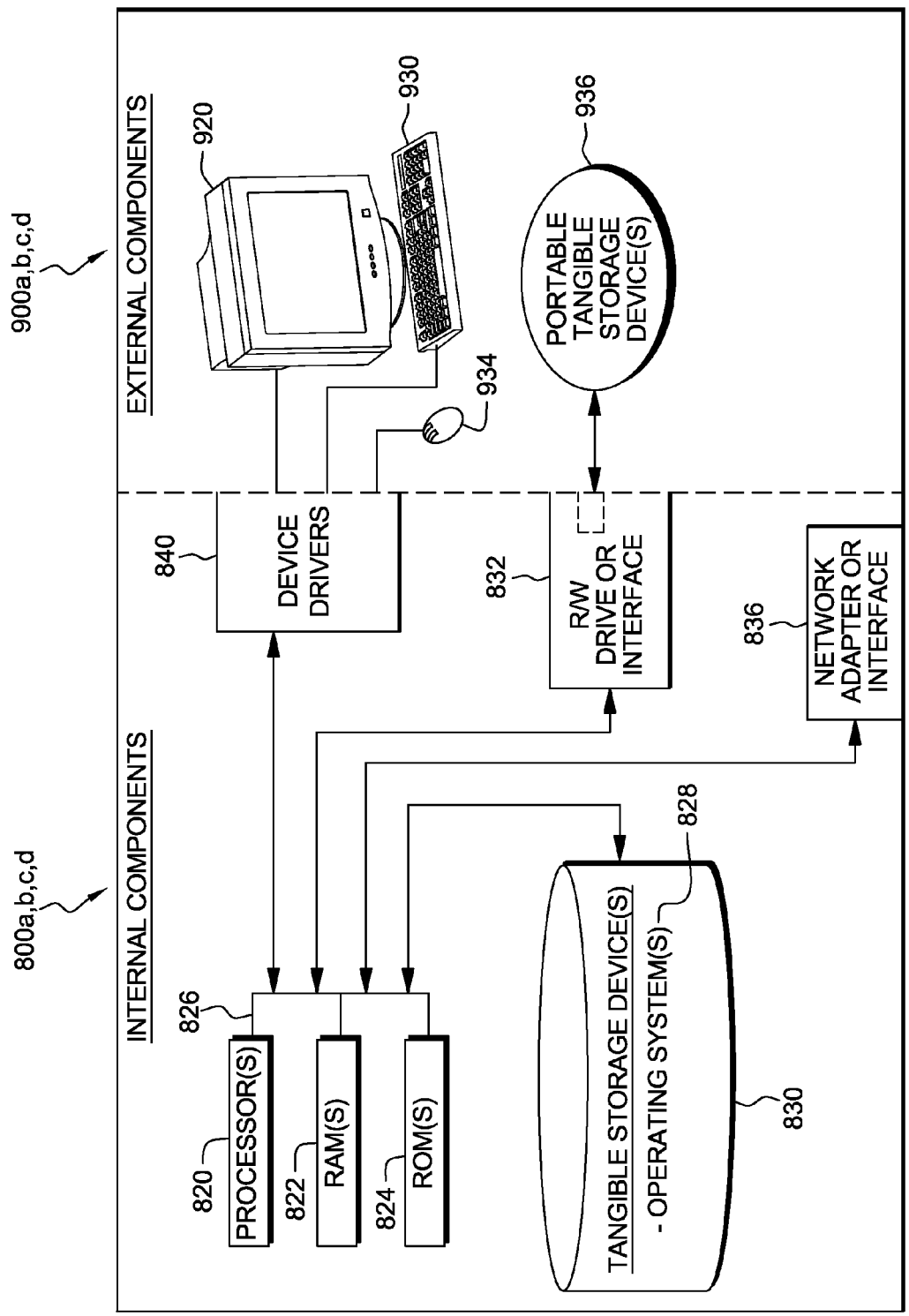
FIG. 3 is a block diagram depicting internal and external components of the server computers of FIG. 1 according to an embodiment of the present invention.

FIG. 3 is a block diagram depicting a set of internal components 800a-800c and 800d and a set of external components 900a -900c and 900d that correspond to respective mobile computing devices 150 and server computer 105. Internal components 800a-800d each include one or more processors 820, one or more computer readable RAMs 822 and one or more computer readable ROMs 824 on one or more buses 826, and one or more operating systems 828 and one or more computer readable tangible storage devices 830. The one or more operating systems 828 and media content filtering client software 155 on mobile computing devices 150; and media content filtering server software 110 on server computer 105 are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a-800d includes a R/W drive or interface 832 to read from and write to one or more portable computer readable tangible storage devices 936 such as CD-ROM, DVD, memory stick, magnetic tape, magnetic disk, optical disk or semiconductor storage device. Media content filtering client software 155 on mobile computing devices 150; and media content filtering server software 110 on server computer 105 can be stored on one or more of the respective portable computer readable tangible storage devices 936, read via the respective R/W drive or interface 832 and loaded into the respective hard drive or computer readable tangible storage device 830.

Furthermore, each set of internal components 800a-800d also includes a network adapter or interface 836 such as TCP/IP adapter card, wireless wi-fi interface card, or 3G or 4G wireless interface card or other wired or wireless communication link. Media content filtering client software 155 on mobile computing devices 150; and media content filtering server software 110 on server computer 105 can be downloaded to respective mobile computing devices 150 and server computer 105 from an external computer or external storage device via a network (for example, the Internet, a LAN, or a WAN) and respective network adapters or interfaces 836. From the network adapter or interface 836, media content filtering client software 155 on mobile computing devices 150; and media content filtering server software 110 on server computer 105 are loaded into at least one respective hard drive or computer readable tangible storage device 830. The network may comprise copper wires, optical fibers, wireless transmission, routers, firewalls, switches, gateway computers and/or servers.

Each set of external components 900a-900d can include a computer display monitor 920, a keyboard 930, and a computer mouse 934. External components 900a-900d can also include touch screens, virtual keyboards, touch pads, pointing devices, and other human interface devices. Each set of internal components 800a-800d also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for customizing language and content of media for an announcement. Therefore, one or more embodiments of the invention have been disclosed by way of example and not limitation.

What is claimed is:

1. A method for customizing language and content of media for an announcement, the method comprising the steps of:
    receiving information about mobile computing devices within a defined area;
    selecting an announcement, from a database based on the information that is received, having audio that is in a language determined as being utilized within the defined area, wherein the language is assigned a first highest ranking, and wherein the first highest ranking indicates that the language is spoken by a majority of people within the defined area;
    selecting a transcription of the audio from the database, wherein the transcription is in a language determined as being utilized within the defined area, and wherein the language is assigned a second highest ranking; and
    instructing a television, of an announcement system, within the defined area to output the audio, and to output the transcription of the audio on a display screen of the television.

2. The method of claim 1, wherein the information about the mobile computing devices within the defined area comprises: a number of the mobile computing devices within the defined area, a default language parameter of each of the mobile computing devices within the defined area, one or more first Boolean parameter values that indicates if an end-user of one of the mobile computing devices that are within the defined area has a hearing impairment, and one or more second Boolean parameter values that indicates if an end-user of one of the mobile computing devices that are within the defined area has a visual impairment.

3. The method of claim 1, wherein the database stores the announcement as a record that includes audio in various languages, and transcriptions of the audio in various languages.

4. The method of claim 1, wherein the step of instructing the television comprises instructing the television to output one or more additional transcriptions of the audio on the display screen of the television, wherein the additional transcriptions are each in a language determined as being utilized within the defined area, and wherein the language is assigned a ranking that is lower than the second highest ranking.

5. The method of claim 1, wherein the step of selecting the announcement comprises computing a number of first Boolean parameter values and a number of second Boolean parameter values received in the information about the mobile computing devices, wherein each of the first Boolean parameter values indicate an end-user of one of the mobile computing devices within the defined area has a hearing impairment, and wherein each of the second Boolean parameter values indicate an end-user of one of mobile the computing devices within the defined area has a visual impairment.

6. The method of claim 5, wherein the step of selecting the announcement further comprises:
    instructing an announcement system to amplify volume of the audio to a suitable predefined level and increase a font size of the transcription of the audio on the display screen of the television, if the number of first Boolean parameter values received is greater than or equal to a first configurable threshold value; and
    instructing the announcement system to increase the font size of the transcription of the audio on the display screen of the television and to adjust color, contrast, and sharpness of images on the display screen to a suitable predefined level, if the number of second Boolean parameter values received is greater than or equal to a second configurable threshold value.

7. A computer system for customizing language and content of media for an announcement, the computer system comprising:
    one or more processors, one or more non-transitory computer readable memories, one or more non-transitory computer readable storage media, and program instructions stored on the one or more storage media for execution by the one or more processors via the one or more memories, the program instructions comprising:
    program instructions to receive information about mobile computing devices within a defined area;
    program instructions to select an announcement, from a database based on the information that is received, having audio that is in a language determined as being utilized within the defined area, wherein the language is assigned a first highest ranking, and wherein the first highest ranking indicates that the language is spoken by a majority of people within the defined area;

program instructions to select a transcription of the audio from the database, wherein the transcription is in a language determined as being utilized within the defined area, and wherein the language is assigned a second highest ranking; and program instructions to instruct a television, of an announcement system, within the defined area to output the audio, and to output the transcription of the audio on a display screen of the television.

8. The computer system of claim 7, wherein the information about the mobile computing devices within the defined area comprises: a number of the mobile computing devices within the defined area, a default language parameter of each of the mobile computing devices within the defined area, one or more first Boolean parameter values that indicates if an end-user of one of the mobile computing devices that are within the defined area has a hearing impairment, and one or more second Boolean parameter values that indicates if an end-user of one of the mobile computing devices that are within the defined area has a visual impairment.

9. The computer system of claim 7, wherein the database stores the announcement as a record that includes audio in various languages, and transcriptions of the audio in various languages.

10. The computer system of claim 7, wherein the program instructions to instruct the television comprises program instruction to instruct the television to output one or more additional transcriptions of the audio on the display screen of the television, wherein the additional transcriptions are each in a language determined as being utilized within the defined area, and wherein the language is assigned a ranking that is lower than the second highest ranking.

11. The computer system of claim 7, wherein the program instructions to select the announcement comprises program instructions to compute a number of first Boolean parameter values and a number of second Boolean parameter values received in the information about the mobile computing devices, wherein each of the first Boolean parameter values indicate an end-user of one of the mobile computing devices within the defined area has a hearing impairment, and wherein each of the second Boolean parameter values indicate an end-user of one of mobile the computing devices within the defined area has a visual impairment.

12. The computer system of claim 11, wherein the program instructions to select the announcement further comprises:

program instructions to instruct an announcement system to amplify volume of the audio to a suitable predefined level and increase a font size of the transcription of the audio on the display screen of the television, if the number of first Boolean parameter values received is greater than or equal to a first configurable threshold value; and program instructions to instruct the announcement system to increase the font size of the transcription of the audio on the display screen of the television and to adjust color, contrast, and sharpness of images on the display screen to a suitable predefined level, if the number of second Boolean parameter values received is greater than or equal to a second configurable threshold value.

* * * * *